May 17, 1932.　　　D. H. SPICER　　　1,858,251

COUPLING

Filed Sept. 23, 1930

INVENTOR
Delphin H. Spicer
BY Hull Brock & West
ATTORNEY

Patented May 17, 1932

1,858,251

UNITED STATES PATENT OFFICE

DELPHIN H. SPICER, OF LAKEWOOD, OHIO

COUPLING

Application filed September 23, 1930. Serial No. 483,901.

This invention relates to couplings for sealing one tube or conduit to another by means of a soft metal sealing member, and to the details of construction involved in the application of the broad principle to certain particular uses.

The principal object of my invention is to provide a configuration of surfaces of the cooperating tube or conduit members which may in cooperation with each other operate upon a soft metal sealing member in such a way as to effect an efficient air-tight seal between said members, and one which will permit the separation and re-sealing of such members a number of times without renewing the sealing member. A further object is to adapt the broad principle for use in a tire valve coupling, and a still further object is to adapt the broad principle for use in connection with two-part valve stems where a rubber seal is impracticable by reason of the deterioration of rubber due to heat or other causes. Other and more limited objects will become apparent as the description proceeds.

Figure 1:
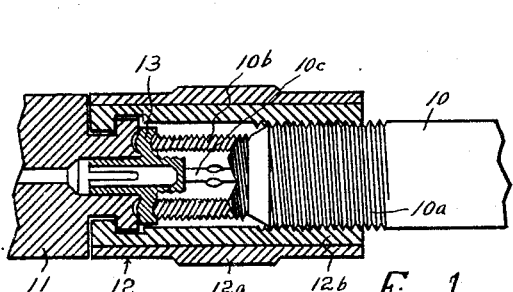
Figure 2:
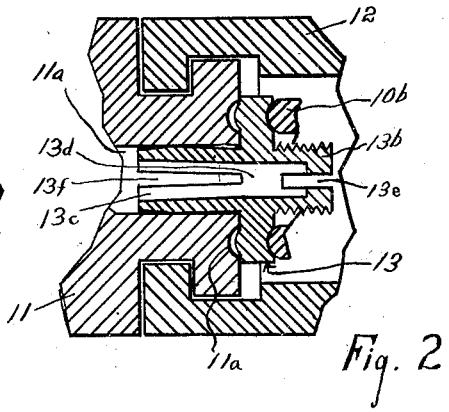
Figure 4:
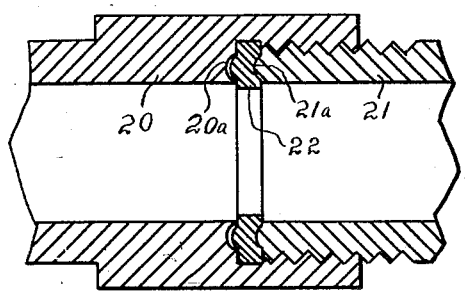
Figure 3:
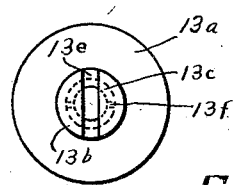
Figure 5:
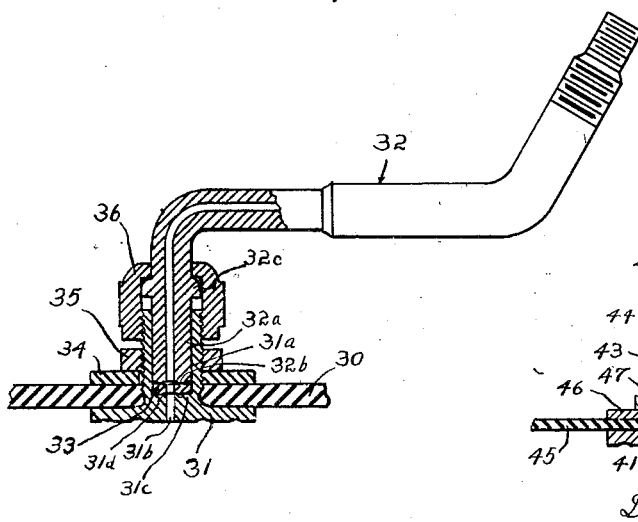
Figure 6:
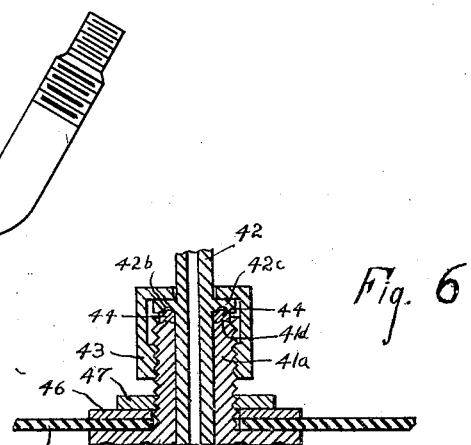

Fig. 1 is a longitudinal section taken through one form of my invention shown in connected position on a tire valve stem; Fig. 2 is an enlarged fragmentry detail corresponding to a portion of the showing of Fig. 1; Fig. 3 is a detail of the sealing member of Figs. 1 and 2 shown removed from the coupling members and looking from the right hand side in Fig. 2; Fig. 4 is a schematic section of a pipe union of general application employing the broad principle of my invention; Fig. 5 is a partial sectional view through a two-piece bent valve stem showing the application of my invention to use in that construction; and Fig. 6 is a fragmentary section showing a variant form of the application of my invention disclosed in Fig. 5.

Referring to the modification disclosed in Figs. 1, 2 and 3, the numeral 10 indicates the usual tire valve stem having the enlarged threaded portion $10^a$, the reduced end portion $10^b$ shown partially in section to illustrate the position of the valve pin $10^c$. The body 11 of the coupling member is swivelly connected with an internally threaded clamping member or cap 12 which may consist of two concentric parts $12^a$ and $12^b$ for convenience in forming the swivel connection. The portion $12^b$ is internally threaded for engagement with the portion $10^a$ of the valve stem 10 and the soft metal sealing member 13 is clamped between the valve stem 10 and the body 11 of the coupling member.

As will be clear from Fig. 2, the body member 11 is provided with a concave annular depression $11^a$ which is of the proper size and configuration in plan to register with the end $10^b$ of the valve stem 10. "Size and configuration to register" refers to the shape of the depression as seen when looking at the valve body in the direction of its axis and not to the cross sectional shape thereof. The valve stem 10 is rounded in general practice, but if one should be found which departed from this construction, a rounded configuration could be imparted by the use of a suitable tool. While it is preferred to provide a groove or concavity which is part circular in cross section, other cross sectional shapes may be used successfully. It is possible to employ different cross sectional shapes of groove and valve stem edge; however, the preferred embodiment is that illustrated in the drawings. Valve stems are usually constructed of a comparatively hard metal and in practice the valve body 11 will preferably be made of a metal similar to that employed in valve stem construction. The sealing member 13 will preferably be made of copped, but any metal may be employed providing it is substantially softer than the tire valve stem whereby it may be deformed to provide a perfectly airtight seal. In the drawings the sealing member 13 has been shown in the position which it will take when tightened on the valve stem. The distortion of the metal of the sealing member is shown as insufficient to completely fill the concavity $11^a$ in the body portion 11. While this is a desirable relation of the parts, since it forms a seal at the two corners of the annular concavity, it may vary considerably according to the pressure which is employed in effecting the seal. The sealing member 13 includes a disk portion $13^a$, a boss $13^b$ and a holding extension $13^c$. As shown, the member 13 is drilled centrally to provide a bore 13ᵈ which terminates short of the end of the boss 13ᵇ. A shallow kerf 13ᵉ is provided across the end of the boss 13ᵇ and of sufficient depth to communicate with the bore 13ᵈ. It is essential that this kerf shall be substantially narrower than the diameter of the valve pin 10ᶜ since the function of the boss is to hold the valve pin depressed. In order to properly position and retain the sealing member 13 in the body member 11 when no pressure is exerted on the same by any clamping action between the valve stem and the body 11, the extension 13ᶜ is slotted as shown at 13ᶠ, slightly tapered inwardly at the end and spread for frictional engagement with the interior of the bore 11ᵃ which extends centrally through the coupling body 11. The boss 13ᵇ is provided with external threads for cooperation with a tool designed to be inserted into the coupling for the purpose of removing the sealing member 13 in the event it should become necessary to replace it.

In Fig. 4 I have shown the application of the broad principle of my invention to a simple pipe coupling. Here the two members 20 and 21 are to be united. One is internally threaded and the other externally threaded. The portion 20 is provided with an annular concave groove 20ᵃ and the portion 21 is provided with a registering convex ridge 21ᵃ. The sealing member consists of a simple soft metal washer 22 which is clamped between the members 20 and 21 to effect a tight sealing relation.

As illustrated in the drawings, the material of which the sealing member 13 is composed and the proportions and dimensions of the various cooperating parts are preferably such that in the normal use of the device the deformation of the sealing member will not be enough to completely fill the depression or groove 11ᵃ. This is a valuable feature inasmuch as slight irregularities in the end of the valve stem 10ᵇ can be more easily compensated for by localized deformations in the direction of the thickness of the sealing member, causing slight projections of the same into the reserve space in the groove 11ᵃ, than by distortion of the metal in lateral directions which would be necessary in the event no reserve space existed.

In Fig. 5 I have shown the application of my device to a two-piece valve stem. The numeral 30 represents a portion of a tire tube provided with an opening to receive the valve stem. The valve stem has extending through the tire 30 a stem portion 31 which is provided with the usual means for gripping the tire tube and has an upwardly extending externally threaded central portion 31ᵃ having a central opening 31ᵇ therethrough. The opening 31ᵇ is of much larger diameter at the top than at the bottom and thereby provides a shoulder 31ᶜ in which I provide an annular groove 31ᵈ corresponding to the groove 11ᵃ in the modification of Fig. 1. Extending into the upper portion 31ᵃ of the member 31 is the lower end 32ᵃ of a valve stem 32. At the end of the portion 31ᵃ is provided with a convex annular rib 32ᵇ which corresponds in size and configuration to the groove 31ᵈ and which is adapted to cooperate with said groove to distort or deform the soft metal sealing member 33 for the purpose of effecting a tight seal, its operation being substantially the same as previously described in connection with the modification of Fig. 2. Engaging the tire 30 on the upper surface and cooperating with the member 31 to form a seal is a washer 34. A nut 35 is provided for drawing the washer 34 and the valve member 31 closely together to prevent escape of air between the tire and the valve. A second shouldered nut 36 is provided to engage the threads of the portion 31ᵃ and to cooperate with the shoulder 32ᶜ on the valve stem 32 for the purpose of pulling the ridge 32ᵇ into tight clamping engagement with the sealing member 33 to effect an air-tight seal between these members which will be unaffected by the comparatively high temperatures to which constructions of this character are subjected and which render such materials as rubber entirely unsuitable for sealing these parts.

A slight variation of the application of my invention shown in Fig. 5 is indicated in Fig. 6. In this form the construction is substantially similar, but differs in that the upper end of the member 41ᵃ corresponding to that of 31ᵃ is provided with a ridge 41ᵈ, and the shoulder 42ᶜ corresponding to that 32ᶜ has provided therein a groove 42ᵇ corresponding to the ridge 32ᵇ. A shouldered nut 43 serves to draw the portions 42 and 41 into clamping relation with the two sides of the seal 44. The tube 45 is clamped between the member 41 and the washer 46 by means of the nut 47 in a manner corresponding exactly with the similar parts in the showing of Fig. 5.

The thickness of the disk portion of the sealing member in the various modifications is susceptible of considerable variation although it is desirable that the same should be thin enough that both surfaces will be somewhat distorted by the pressure which is applied for sealing purposes.

From the foregoing it will be obvious that I have provided a sealing coupling well adapted for its intended uses, and while I have illustrated certain embodiments, I do not wish to be limited to the details thereof but wish it understood that my invention is susceptible of incorporation in various forms within the scope of the appended claims.

Having thus described my invention, what I claim is:

1. A coupling for attaching a conduit to a tire valve stem comprising, a body member having an air passage centrally therethrough, an annular groove in the end of said body member surrounding the end of said passage and conforming in size and configuration to the end of said valve stem, a malleable metal sealing member and means for clamping said sealing member between said body member and said valve stem, said last means consisting of an internally threaded cap swiveled upon said body member and adapted to be screwed on said valve stem.

2. A coupling for attaching a conduit to a tire valve stem comprising, a body member having an air passage centrally therethrough, an annular groove in the end of said body member surrounding the end of said passage and conforming in size and configuration to the end of said valve stem, a malleable metal sealing member and means for clamping said sealing member between said body member and said valve stem, said sealing member including a portion adapted to enter said air passage to retain the same in proper position with respect to the body member when the same is not in position on said valve stem.

3. A coupling for attaching a conduit to a tire valve stem comprising, a body member having an air passage centrally therethrough, an annular groove in the end of said body member surrounding the end of said passage and conforming in size and configuration to the end of said valve stem, a malleable metal sealing member and means for clamping said sealing member between said body member and said valve stem, said sealing member having thereon an externally threaded boss adapted for cooperation with a tool for removal from said body member.

4. A coupling for attaching a conduit to a tire valve stem comprising, a body member having an air passage centrally therethrough, an annular groove in the end of said body member surrounding the end of said passage and conforming in size and configuration to the end of said valve stem, a malleable metal sealing member and means for clamping said sealing member between said body member and said valve stem, said sealing member including a portion adapted to enter said air passage to retain the same in proper position with respect to the body member when the same is not in position on said valve stem, said sealing member having thereon an externally threaded boss adapted for cooperation with a tool for removal from said body member.

5. A coupling for attaching a conduit to a tire valve stem comprising, a body member having an air passage centrally therethrough, an annular groove in the end of said body member surrounding the end of said passage and conforming in size and configuration to the end of said valve stem, a malleable metal sealing member and means for clamping said sealing member between said body member and said valve stem, said sealing member having thereon a boss for depressing the usual valve pin to hold the valve open.

6. A coupling for attaching a conduit to a tire valve stem comprising, a body member having an air passage centrally therethrough, an annular groove in the end of said body member surrounding the end of said passage and conforming in size and configuration to the end of said valve stem, a malleable metal sealing member and means for clamping said sealing member between said body member and said valve stem, said sealing member including a portion adapted to enter said air passage to retain the same in proper position with respect to the body member when the same is not in position on said valve stem, said sealing member having thereon a boss for depressing the usual valve pin to hold the valve open.

7. As an article of manufacture, a sealing member for a tire valve including a soft metal disk, having thereon a boss adapted to engage and depress a valve pin.

8. As an article of manufacture, a sealing member for a tire valve including a soft metal disk, having thereon a boss adapted to engage and depress a valve pin, said boss being externally threaded for engagement with a pulling tool.

9. As an article of manufacture, a sealing member for a tire valve including a soft metal disk, having thereon a boss adapted to engage and depress a valve pin, and an oppositely disposed extension adapted to frictionally hold said member in a coupling body.

10. As an article of manufacture, a sealing member for a tire valve including a soft metal disk, having thereon a boss adapted to engage and depress a valve pin, and an oppositely disposed, tubular, kerfed extension adapted to frictionally hold said member in a coupling body.

In testimony whereof, I hereunto affix my signature.

DELPHIN H. SPICER.